US006551740B1

(12) United States Patent
Melichar

(10) Patent No.: US 6,551,740 B1
(45) Date of Patent: Apr. 22, 2003

(54) BATTERY ASSEMBLY AND A METHOD FOR COOLING A BATTERY ASSEMBLY

(75) Inventor: Robert John Melichar, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 09/682,694

(22) Filed: Oct. 5, 2001

(51) Int. Cl.[7] .............................................. H01M 10/50
(52) U.S. Cl. ......................... 429/120; 429/72; 429/99; 429/176
(58) Field of Search ........................... 429/120, 99, 71, 429/72, 176

(56) References Cited

U.S. PATENT DOCUMENTS

| 4,007,315 A | | 2/1977 | Brinkmann | |
|---|---|---|---|---|
| 4,522,898 A | * | 6/1985 | Esrom | 429/120 |
| 5,212,024 A | * | 5/1993 | Klink et al. | 429/72 |
| 5,424,143 A | | 6/1995 | Shrim | |
| 5,432,026 A | | 7/1995 | Sahm | |
| 5,577,747 A | | 11/1996 | Ogawa | |
| 5,589,290 A | * | 12/1996 | Klink et al. | 429/99 |
| 5,937,664 A | | 8/1999 | Matsuno | |
| 6,335,116 B1 | * | 1/2002 | Yamane et al. | 429/176 |

* cited by examiner

Primary Examiner—John S. Maples
(74) Attorney, Agent, or Firm—Ford Global Technologies, Inc.

(57) ABSTRACT

A battery assembly 10 including a generally hollow housing 14 and several batteries 12 which are disposed within the interior cavity 16 of the housing 14. Particularly, the batteries 12 reside upon the axis 50 and partition the cavity 16 into a first tapered region 54 and a second expanding portion 56, effective to cause the speed of the air flowing through the cavity 16 to be substantially constant as the air passes the surface of the batteries 12.

8 Claims, 1 Drawing Sheet

BATTERY ASSEMBLY AND A METHOD FOR COOLING A BATTERY ASSEMBLY

BACKGROUND OF INVENTION (1) Field of the Invention

The present invention generally relates to a battery assembly and to a method for cooling a battery assembly and more particularly, to a battery assembly including several batteries which are positioned within the battery assembly in a certain manner which is effective to allow the batteries to be selectively and efficiently cooled.

(2) Background of the Invention

Battery assemblies are typically formed from the electrical and physical coupling of several batteries. One example of a battery assembly is a series arrangement in which each of the batteries is deployed or resides upon a certain single axis and occupies a respectively unique location upon the axis. While such a series arrangement does desirably provide a relatively compact or flat arrangement which is easily deployable, even in locations having a limited amount of available mounting space, it is not efficiently cooled by the use of current battery cooling strategies.

That is, it is desirable to have each of the batteries be maintained at a substantially similar temperature in order to have each of the batteries maintain a substantially similar state of charge. It is further desirable to cause the temperature of each of the batteries to reside within a certain optimal temperature range in order to allow the batteries to efficiently operate and to protect the batteries from heat related damage. The batteries therefore must be cooled, from an external source, since the batteries typically generate heat when operating.

Cooling is typically accomplished by the use of a fan which selectively communicates air to the batteries. Particularly, the provided air typically traverses each of the batteries in a sequential manner (e.g., the air first contacts the battery which is closest to the location at which the air is provided and then traverses along the axis upon which the batteries reside, contacting each of the other batteries in an order which is dependent upon the respective location of the other batteries upon the axis).

This battery cooling strategy is not efficient since heat from each of the serially connected batteries is provided to the air as the air travels past and contacts each of the respectively coupled batteries. Hence, batteries which are located toward the end of the serial arrangement (e.g., batteries which are located at a relatively large distance from the location at which the air was initially communicated to the batteries) are not efficiently cooled since the air which contacts these batteries has an elevated temperature, and may even have become relatively hot.

The present invention overcomes these drawbacks in a new and novel manner while desirably allowing a series type battery arrangement to be efficiently utilized and desirably and selectively cooled, effective to allow the batteries to maintain a substantially similar state of charge.

SUMMARY OF INVENTION

It is a first non-limiting advantage of the present invention to provide a battery assembly which overcomes some or all of the previously delineated drawbacks of prior battery assemblies.

It is a second non-limiting advantage of the present invention to provide a method for cooling a battery assembly which overcomes some or all of the previously delineated drawbacks of cooling methodologies and strategies.

According to a first non-limiting aspect of the present invention, a battery assembly is provided. Particularly, the battery assembly includes a generally hollow housing; and a plurality of batteries which are disposed in a certain arrangement within the generally hollow housing, effective to form an air delivery path and to cause the pressure within the air delivery path to be substantially constant.

According to a second non-limiting aspect of the present invention, a battery assembly is provided. Particularly, the battery assembly includes a generally hollow housing; and a plurality of batteries which partition the interior of the housing into a first tapered portion and a second expanding portion.

According to a third non-limiting aspect of the present invention, a method for cooling a battery assembly of the type including a plurality of batteries is provided. The method includes the steps of providing a generally hollow housing; forming a first aperture within the housing; forming a second aperture within the housing; disposing the plurality of batteries within the housing in a certain arrangement; communicating air to the generally hollow housing through the first aperture, wherein the air traverses the generally hollow housing and emanates from the generally hollow housing through the second aperture, the certain arrangement of the batteries being effective to cause the speed of the traversing air to be substantially constant.

These and other features, aspects, and advantages of the present invention will become apparent from a consideration of the following detailed description of the preferred embodiment of the invention and by reference to the following drawings.

DETAILED DESCRIPTION

Figure 1:
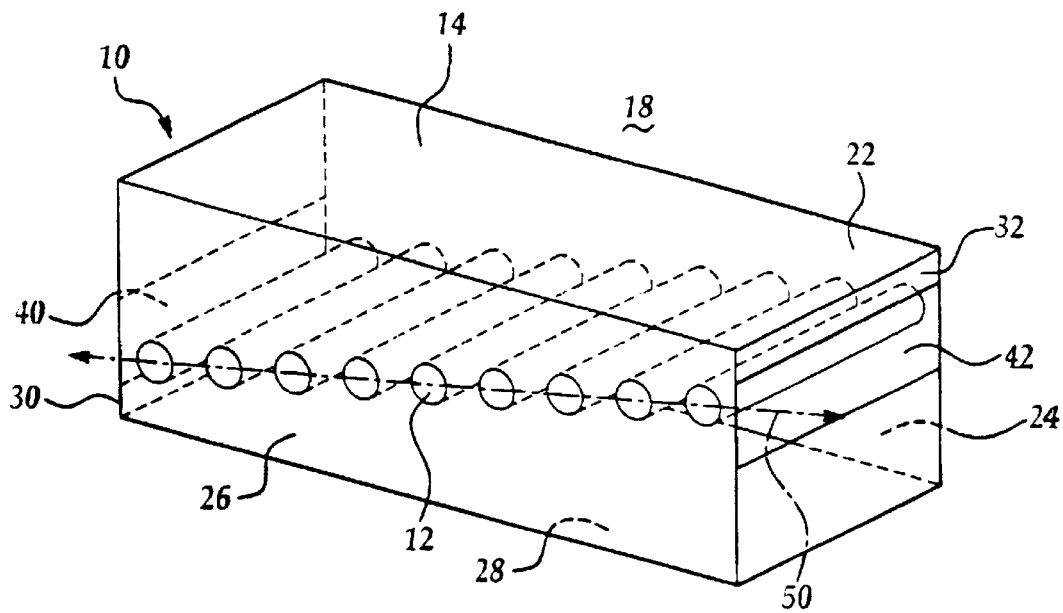
FIG. 1 is a perspective view of a battery assembly which is made in accordance with the teachings of the preferred embodiment of the invention.
Figure 2:
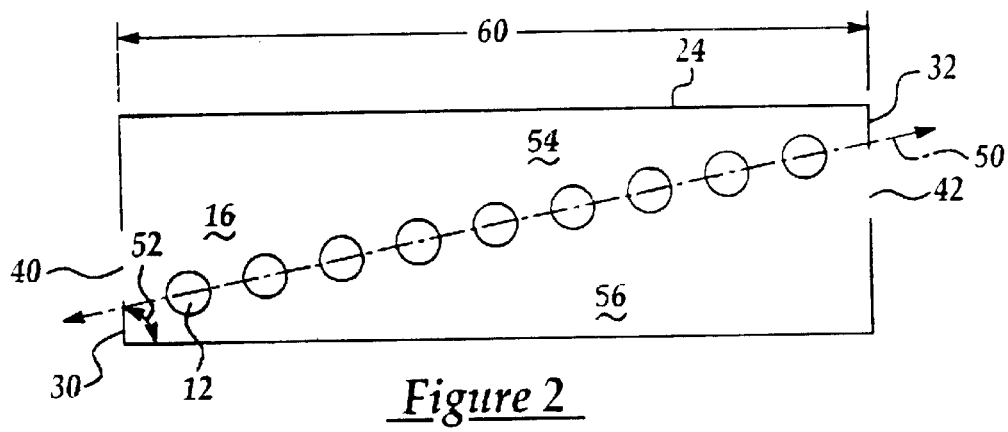
FIG. 2 is a cross sectional view of the battery assembly which is shown in FIG. 1.

Referring now to FIGS. 1 and 2, there is shown a battery assembly 10 which is made in accordance with the teachings of the preferred embodiment of the invention. Particularly, the battery assembly 10 includes several substantially identical and generally cylindrical batteries 12 and a generally hollow housing or plenum member 14 having a substantially rectangular cross sectional area and having an interior cavity 16 into which the batteries 12 are operatively disposed.

Particularly, as shown, each of the batteries 12 are deployed upon (e.g., removably coupled to) the surface 18 in a conventional manner (e.g., received into reception slots or openings in the surface 18) and extend into the cavity 16 through sidewall 22 of the housing 14. Housing 14 further includes substantially identical top and bottom members 24, 26, a second and opposed sidewall member 28, and front and rear members 30, 32. As shown, the members 22, 24, 26, 28, 30, and 32 cooperatively form a generally rectangular battery containment receptacle or plenum member 14. Sidewall 22 may be removably secured, in one non-limiting embodiment, to surface 18 or plenum 14 and/or may be coupled to another member or structure (not shown) and positioned with respect to surface 18 in the manner shown in FIGS. 1 and 2.

Further, member 30 includes an air reception aperture 40 and member 32 includes an exit aperture 42. It should be appreciated that the battery containment housing 14 may be of substantially any desired shape and that the invention is not limited to the housing which is shown in FIGS. 1 and 2 or to any other type of housing. It should be further appreciated that apertures 40, 42 may be of any desired shape or size and that nothing is this description is meant to limit the present invention to the apertures 40, 42 shown in FIGS. 1 and 2. Moreover, it should be appreciated that batteries 12 may be of any substantially desired shape and that nothing in this description should limit the invention to cylindrical type batteries.

In the preferred embodiment of the invention, the batteries 12 are deployed, in serial fashion, along an axis 50 which makes an acute angle 52 with the housing 14 (e.g., with the side wall 28 of the housing 14). In this manner, the batteries 12 cooperatively partition the interior cavity 16 into a first tapered portion or air delivery/inlet path 54 and a second expanding portion or air exit path 56. Particularly, as shown, portion 54 is tapered from the air inlet aperture 40 to the exit aperture 42 while the portion 56 is tapered in a direction from the exit aperture 42 to the air inlet aperture 40 and expands in a direction from the air inlet aperture 40 to the exit aperture 42. In one non-limiting embodiment of the invention, the cross-sectional area of portion 54 decreases at a substantially constant rate and the cross-sectional area of portion 56 increases, in the direction from aperture 40 to aperture 42, at about the same rate as the portion 54 decreases. Further, portion 56 decreases, at about the same rate as portion 54 decreases the direction from aperture 42 to aperture 40. In this non-limiting embodiment, each portion 54, 56 is also of a substantially identical length 60. In one non-limiting embodiment of the invention, each of the batteries 12 has a diameter of about 32 millimeters and a separation distance of about 1 millimeter exits between each pair of adjacent batteries 12. Other diameters and separation distances may be utilized. In operation, air is provided from a source (not shown) to the path 54, through aperture 40. The received air traverses path 54, contacts the batteries 12 (i.e., passes over/under the batteries 12), and enters path 56. The air then exits the plenum 14, through aperture 42.

The foregoing arrangement causes the pressure within the air delivery portion or path 54 of cavity 16 to remain substantially constant and further causes the pressure within the exit portion 56 of the cavity 16 to also be substantially constant, but at a substantially lower pressure than the pressure of portion 54. Moreover, this battery arrangement causes the speed of the air flowing through the cavity 16 to also be substantially constant, thereby allowing each of the batteries 12 to be cooled in a substantially similar manner since the heat transfer coefficient is proportional to the speed of the air passing by and contacting each of the batteries 12, thereby causing each of the contained batteries to have a substantially similar state of charge.

It is to be understood that the foregoing is not limited to the exact construction and method which has been previously delineated, but that various changes and modifications may be made without departing from the spirit and the scope of the inventions as are more fully delineated in the following claims.

What is claimed is:

1. A method for cooling a plurality of batteries, said method comprising the steps of:

providing a generally hollow housing having a pair of opposed walls and a floor;

forming a first aperture within a first of said pair of opposed walls;

forming a second aperture within a second of said pair of opposed walls, wherein said second aperture is at a certain acute angle relative to said first aperture and said floor;

disposing said plurality of batteries within said housing in a series arrangement in which each of said plurality of batteries resides upon a certain single axis; and communicating air to said generally hollow housing through said first aperture, wherein said air traverses said generally hollow housing and emanates from said generally hollow housing through said second aperture, said series arrangement of said batteries being effective to cause said speed of said traversing air to be substantially constant.

2. The method of claim 1 wherein said certain axis forms an acute angle which is approximately the same as said certain acute angle between said first aperture and said second aperture.

3. The method of claim 1 wherein said plurality of batteries partition the interior of said generally hollow housing into two portions, a first of said two portions tapering and extending from said first aperture to said second aperture and a second of said two portions tapering and extending from said second aperture to said first aperture.

4. The method of claim 3 wherein each of said two portions have a respective rate of taper and wherein said rate of taper of said first portion is substantially identical to said rate of taper of said second portion.

5. The method of claim 4 wherein each of said first and second portions has respective lengths and wherein said length of said first portion is substantially identical to the length of said second portion.

6. The method of claim 5 wherein each of said plurality of batteries is substantially identical.

7. The method of claim 6 wherein each of said plurality of batteries is substantially cylindrical.

8. The method of claim 1 further comprising the step of causing said housing to have a substantially rectangular cross sectional area.

* * * * *